UNITED STATES PATENT OFFICE.

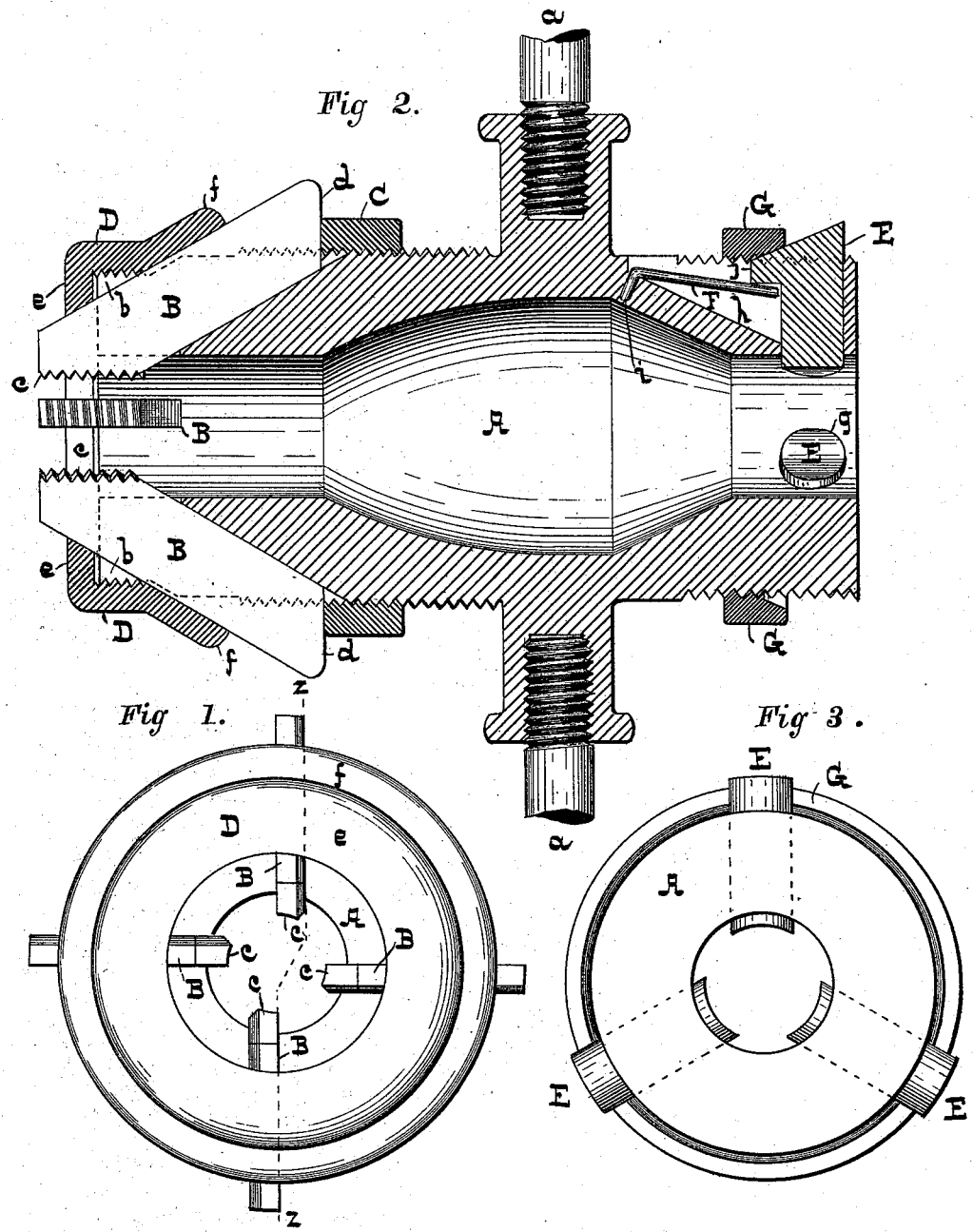

JOHN E. McCANNA, OF BALTIMORE, MARYLAND.

THREAD-CUTTING DIE.

SPECIFICATION forming part of Letters Patent No. 401,962, dated April 23, 1889.

Application filed January 26, 1889. Serial No. 297,607. (No model.)

*To all whom it may concern:*

Be it known that I, JOHN E. McCANNA, of the city of Baltimore, and State of Maryland, have invented certain Improvements in Thread-Cutting Dies, of which the following is a specification.

This invention relates to a die in which the thread-cutting parts are radially adjustable, so that pipes, bolts, &c., of different sizes may be threaded.

It further relates to means for guiding the pipe to be cut, as will hereinafter fully appear.

In the further description of the said invention which follows reference is made to the accompanying drawings, forming a part hereof, and in which—

Figure 1 is a front end view of the invention, and Fig. 2 a section of the same, taken on the dotted line $z\ z$. Fig. 3 is a rear end view of the invention.

Similar letters of reference indicate similar parts in all the views.

In the said drawings, A is the stock, having the handles $a$, a part only of which is shown. The front portion of the stock, which is hollow, is provided with a series of threading-cutters, B, which may be three or more in number, seated in slots $b$, the lower sides of which are at an angle with reference to the center line of the tool, as shown in Fig. 2. These blades or cutters consist of flat pieces of steel with their inner faces, $c$, threaded.

The outside of the front body of the stock is threaded and fitted with a nut, C, against which the rear faces, $d$, of the cutters bear. The said cutters are held tightly against the nut C and the inclined surface at the bottom of the slots by means of a cap, D, screwed on the end of the stock, which is reduced in size. The lip $e$ of the cap D bears on the upper inclined surface of the cutters in the same manner as does the rear portion or flange, $f$. By means of this arrangement the cutters are always in exact alignment with each other, and no crossing of threads can occur in adjusting them to suit different-sized bolts or pipes. The adjustment of the cutters is effected by means of the nut C, and after this adjustment the cutters are held firmly in place by setting up the cap D, or vice versa.

The centering mechanism, which keeps the pipe or bolt central of the stock, consists of three bolts, E, which are inserted in radial holes $g$. A slot, $h$, is cut in the rear of each hole $g$, and in these slots are placed springs F, the bent ends of which rest in holes $i$, drilled in the slot. (See Fig. 2.) The straight parts of the springs F bear against the lugs $j$ on the bolts E, and the springs thereby serve to keep the bolts expanded or radially extended. The outer ends of the bolts E are turned so as to present an inclined surface to a nut, G, screwed on the rear body of the stock, as shown particularly in Fig. 2. By means of this nut the bolts E may be forced in, so that the inner ends will bear against the pipe or bolt to be cut.

If a larger pipe or bolt is to be cut, the nut G is turned back and the springs F throw out the bolts and keep them tightly in contact with the nut.

The inner faces or ends of the bolts E are turned hollow, as shown in Figs. 2 and 3; but these hollow faces are not necessary, as the pipe would be accurately centered with straight or round faces.

If the stock is to be applied to a lathe or some cutting-machine, the rear centering-guides will not be necessary.

It will be understood that the tool as constructed may be employed to cut threads from either end of the same, and the cutters, projecting through the cap D, admit of threads being cut on pipes or bolts which project only a short distance from, say, a wall.

I claim as my invention—

1. In a thread-cutting tool, the stock provided with angularly-placed slots and threading-cutters seated in said slots, combined with a cap having an angular face adapted to fit against the outer surface of the said cutters, substantially as and for the purpose specified.

2. In a thread-cutting tool, the stock thereof provided with a series of angularly-placed thread-cutting blades seated in slots, combined with a cap having an angular face which bears against the said blades and an adjusting-nut to clamp the same, substantially as and for the purpose specified.

3. In a thread-cutting tool, the stock thereof having a series of centering-bolts with inclined outer ends, combined with a nut with an inclined inner face which fits over the said ends and springs to hold the said bolts out and against the said nut, substantially as and for the purpose specified.

4. In combination with the stock A, having the radially-placed holes $g$, the bolts E, having the projections $j$, springs F, and nut G, screwed on the outside of the said stock, substantially as and for the purpose specified.

5. In a thread-cutting tool, the stock exteriorly threaded and provided with angularly-placed slots, combined with a cap having an angular inner face, screwed on the stock, and threading-cutters seated in the slots in the stock, with their outer inclined edges in contact with the inner face of the cap and their threading ends projecting through the cap, substantially as and for the purpose specified.

JOHN E. McCANNA.

Witnesses:
WM. T. HOWARD,
F. X. RUSSELL.